June 9, 1931. H. M. GRAUL 1,809,553
TOOL HOLDER
Filed March 25, 1926
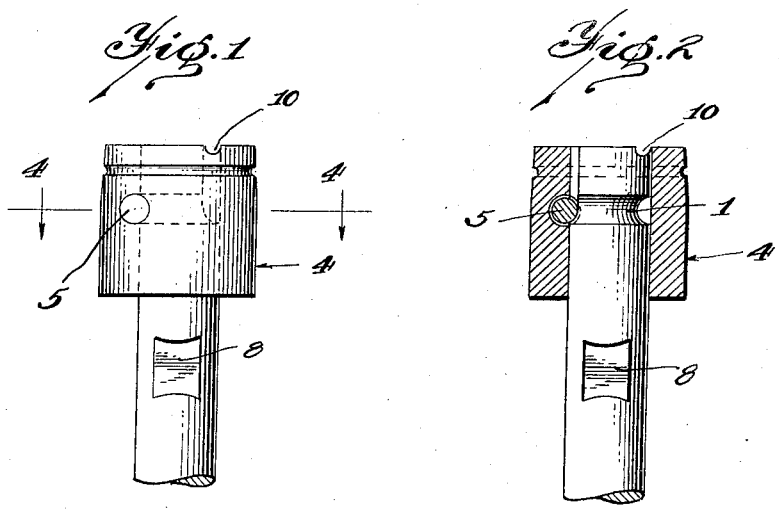
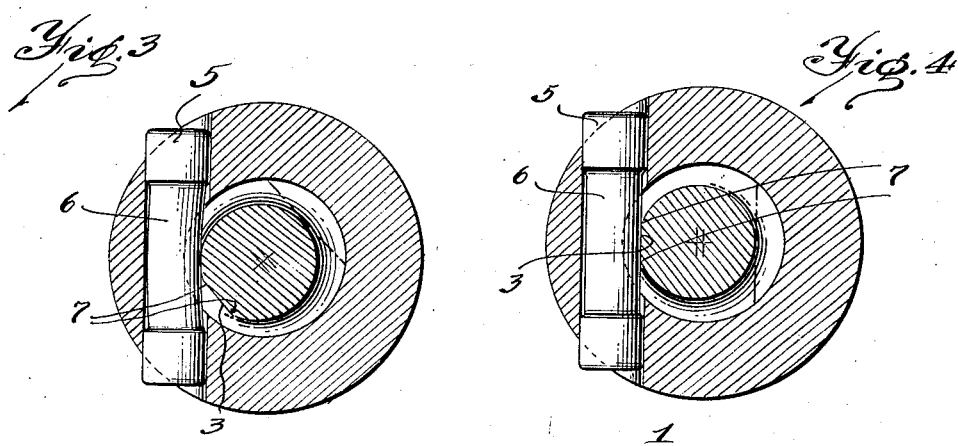
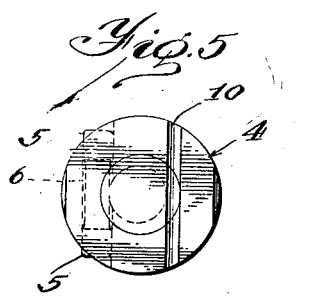
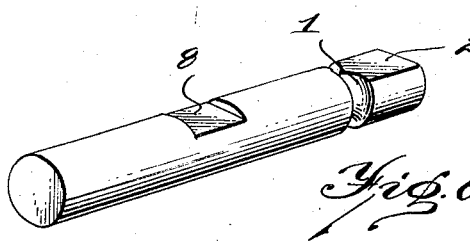
INVENTOR.
Hermann M Graul.
BY
Stuart C Barnes
ATTORNEY.

Patented June 9, 1931

1,809,553

UNITED STATES PATENT OFFICE

HERMANN M. GRAUL, OF DETROIT, MICHIGAN; EDITH P. GRAUL ADMINISTRATRIX OF SAID HERMANN M. GRAUL, DECEASED

TOOL HOLDER

Application filed March 25, 1926. Serial No. 97,480.

This invention relates to a tool holder, and has to do particularly with a combination of a novel holder and tool, therefore, whereby the two parts may be quickly assembled into positive locking relation.

Hitherto, in the tool holder art many different devices have been designed for holding various kinds of tools such as punches, drills, etc., but much difficulty has been encountered in holding the tool within the holder during successive operations thereof. In other words, tool holders in the prior art which have been designed to receive and hold tools by simple relative movements therebetween, have been unsatisfactory for the reason that the tools have either jarred loose, or have been twisted from their holder during operation on the work.

It is the object of the present invention to provide a simple, compact tool holder which is designed to receive the tool by a mere relative turning movement between the two parts and which is also designed to positively retain the tool in working position until positively removed when desired. A further object of the present invention is the provision of means forming a part of the tool holder which normally tends to resist the assemblage of the tool holder and tool, but which, when the two parts have been assembled resists disassemblage of parts except by positive intentional removal.

In the drawings:

Fig. 1 is an elevation of my novel tool holder and tool in assembled locked position.

Fig. 2 is a longitudinal sectional view showing the tool turned to unlocked position, or to a position 180 degrees from the position shown in Fig. 1.

Fig. 3 is an enlarged detail cross sectional view taken through the locking pin in the holder and showing the position of the tool just preparatory to being moved into the locked position and also showing the manner of springing the locking pin in the holder to permit the movement of the tool into locked position.

Fig. 4 is an enlarged detail cross sectional view taken on line 4—4 of Fig. 1, showing relative positions between the tool, holder and locking pin when the tool is in locked position.

Fig. 5 is a top plan view of the structure shown in Fig. 1.

Fig. 6 is a perspective view of the preferred form of the shank of the tool designed to be used in combination with my novel tool holder.

It will be understood that my novel tool holder can be utilized for holding and positioning any kind of working tool, and for the purpose of illustration, I have shown a combination of a tool holder and suitable punch. As is shown in Fig. 6, this tool, or any tool designed to be used with my tool holder, may be of general cylindrical design and provided with an annular groove 1 adjacent the upper end thereof. The part of the tool, separated from the general cylindrical shank by the groove 1, is provided with a flat surface 2. In the turning up of this tool, the groove 2 is preferably turned eccentrically to the general axis and circumference of the tool and tool holder, the eccentricity being in a direction at right angles to the flat surface 2. The extreme eccentric point of this annular groove 1 is provided with a flat surface 3, clearly shown in Fig. 3. The purpose of this flat surface 3 will be presently described.

The tool holder for this tool may be designated 4 and is preferably of cylindrical shape and drilled to receive the shank of the tool, as illustrated in Figs. 1 and 2. A suitable hole, or aperture is provided in the wall of the tool holder and designed to receive a pin 5. This pin is designed to register with the groove 1 in the tool, and is so positioned in the tool holder that when the tool is inserted in the holder, and the groove 1 registers with the pin 5, the top of the tool will be flush, or in desired relation to the top of the tool holder. This pin 5 is preferably turned down at its central portion, as at 6, and the longitudinal axis of the pin is so positioned relatve to the longtudinal axs of the tool holder that the inner edge of the turned down portion of the pin will extend past the periphery of the inner wall of the tool holder, as clearly shown in Figs. 3 and 4. The flat surface 2 on the tool is of such depth as to admit the tool into the holder, as shown in Fig. 2, whereby the tool may be turned so that the turned down portion 6 of the pin 5 will register with the groove 1 and support the tool.

As the circumference of the groove 1 is eccentric with reference to the circumference of the tool holder, as is clearly shown in Figs. 3 and 4, it will be obvious that as the tool is inserted, as in Fig. 2, and turned, that this eccentric portion of the groove will gradually bear with increased pressure against the pin 5. As shown in Fig. 3, the groove 1 is provided with a suitable flat 3 diametrically opposite to the flat surface 2 of the tool, when in locked position. By reason of the eccentricity of the groove 1, it will be obvious that two high points will be provided at each edge of the flat 3. These high points may be designated 7.

The pin 5 is preferably made of resilient material, such as spring steel. The shank of the tool is also provided with the flattened portions 8 diametrically positioned from each other and designed to receive a suitable tool for turning the punch, or tool, within the tool holder.

In assembling this tool and holder, it is only necessary to insert the tool within the holder, as shown in Fig. 2, whereby the flat surface 2 will pass by the pin 5. After the tool has been so inserted and the pin 5 engaged with the shoulder formed by the groove 1, the tool may be turned to the right or the left in the tool holder, until the eccentric part, or high point 7 of the eccentric groove 1 comes in contact with the turned down portion 6 of the pin 5. At this point increased turning effort may be applied to the tool, by means of a suitable wrench contacting with the surfaces 8, or otherwise, whereby either one of the high points 7 will be made to contact with and spring the turned down portion 6 of the pin 5 out of alignment. Further turning movement of the tool relative to the holder, will permit the flat 3 to engage the turned down portion 6, whereby such turned down portion 6 will be permitted to return to its normal position of alignment. This last position of the tool is illustrated in Fig. 4 and it will be seen from this figure that the turned down portion 6 of the pin is parallel to the flat 2, whereby such tool will be prevented from turning by reason of the high spots 7 of the eccentric groove contacting with the pin 6.

The top of the tool holder may be provided with a suitable groove 10, which is designed to register with the flat surface 2 of the tool when such tool is in locked position to complete the side wall of such channel, or groove 10, as is shown in Fig. 5, to assist in positioning or holding tool and holder in the machine.

It will thus be seen that I have provided a simple, novel and compact tool holder and tool therefore, which two parts can be easily and quickly assembled by mere relative turning movement whereby the tool itself will be positively locked with respect to the tool holder by means of the spring pin contained therein. The tool will thus be positively held in working, or punching position until it is desired to positively remove the same.

What I claim is:

1. In a tool holder, the combination of a holder member provided with a tool receiving aperture, a yieldable pin positioned in the walls of the said holder member, the central portion of said pin being turned down and spaced from the walls of said tool holder, and a tool insertable longitudinally in said holder member, said tool being rotatable to press a portion of said pin out of alignment with the normal axis thereof to permit the tool to be moved in positive locking position.

2. In a tool holder the combination of a holder member, a tool insertable therein, a pin yieldably positioned in a recess in the walls of said holder member and spaced from a wall of said recess, a groove in said tool having a surface adapted to engage and spring the pin upon rotation of the tool, and a flat surface on the periphery of said groove for engaging said pin after being sprung into such position to positively lock the tool in working position.

3. In a tool holder the combination of a holder member, a tool insertable therein, a resilient pin positioned in the walls of said holder member and engageable with a groove in said tool, the portion of the pin opposite the portion adapted to engage in said groove being spaced from the wall of said holder member to permit distortion of the pin, a flat surface on the periphery of said groove for engaging said pin to positively lock the tool in working position, and a high point adjacent said flat surface for resiliently distorting said pin before said tool is moved into locking position.

4. In a tool holder, the combination of a holder member provided with a recess for receiving a resilient pin, a portion of said pin being spaced from the wall of the recess whereby the pin may be sprung, a tool member provided with a flattened surface whereby it is insertable within the holder member past the pin, said tool being provided with a groove engageable with said pin, said groove being eccentric relative to said tool whereby said pin will be sprung in moving the tool into locking position.

In testimony whereof he affixes his signature.

HERMANN M. GRAUL.